US012540098B2

(12) United States Patent
Lemke et al.

(10) Patent No.: US 12,540,098 B2
(45) Date of Patent: Feb. 3, 2026

(54) SYSTEM AND METHOD FOR THERMALLY TREATMENT OF AIR-DISPERSIBLE RAW MATERIAL

(71) Applicants: thyssenkrupp Polysius GmbH, Beckum (DE); thyssenkrupp AG, Essen (DE)

(72) Inventors: Jost Lemke, Ennigerloh (DE); Karl Lampe, Ennigerloh (DE)

(73) Assignees: thyssenkrupp Polysius GmbH, Beckum (DE); thyssenkrupp AG, Essen (DE)

( * ) Notice: Subject to any disclaimer, the term of this patent is extended or adjusted under 35 U.S.C. 154(b) by 343 days.

(21) Appl. No.: 18/277,032

(22) PCT Filed: Feb. 4, 2022

(86) PCT No.: PCT/EP2022/052749
§ 371 (c)(1),
(2) Date: Aug. 11, 2023

(87) PCT Pub. No.: WO2022/171540
PCT Pub. Date: Aug. 18, 2022

(65) Prior Publication Data
US 2024/0116809 A1    Apr. 11, 2024

(30) Foreign Application Priority Data

Feb. 12, 2021 (BE) .................................. 2021/5101
Feb. 12, 2021 (DE) .................... 10 2021 201 356.2

(51) Int. Cl.
*C04B 7/43* (2006.01)
*C04B 2/10* (2006.01)
(Continued)

(52) U.S. Cl.
CPC .............. *C04B 7/434* (2013.01); *C04B 2/108* (2013.01); *C04B 7/4446* (2013.01);
(Continued)

(58) Field of Classification Search
CPC ....... C04B 7/434; C04B 2/108; C04B 7/4446; F27B 7/2033; F27B 1/26; F27D 21/0014;
(Continued)

(56) References Cited

U.S. PATENT DOCUMENTS 4,002,421 A * 1/1977 Summer ................. F27B 1/005
432/19
4,782,766 A * 11/1988 Lee .......................... F23N 5/006
236/15 E
(Continued)

FOREIGN PATENT DOCUMENTS

CN    104819650 A    8/2015
CN    109312984 A    2/2019
(Continued)

OTHER PUBLICATIONS

WO-2017220457-A1 translation (Year: 2025).*
(Continued)

*Primary Examiner* — Steven S Anderson, II
*Assistant Examiner* — Kurt J Wolford
(74) *Attorney, Agent, or Firm* — thyssenkrupp North America, LLC

(57) ABSTRACT

The present disclosure relates to a method of thermal treatment of air-dispersible raw material, especially cement raw meal and/or mineral products, wherein the raw material is introduced into a conduit through which hot gases flow and is subjected to thermal treatment by the hot gases and/or the radiant heat in the conduit, fuel is at least partly converted in a treatment region, and the heat generated in the treatment region is supplied at least partly to the conduit, and (Continued)

an oxygen-rich gas is introduced into the treatment region, wherein the oxygen content in the hot gas and/or the gas temperature is ascertained and the amount of oxygen introduced into the treatment region is adjusted by open-loop or closed-loop control depending on the temperature ascertained and/or the oxygen content.

6 Claims, 2 Drawing Sheets

(51) Int. Cl.
| | |
|---|---|
| *C04B 7/44* | (2006.01) |
| *F23N 5/00* | (2006.01) |
| *F27B 1/26* | (2006.01) |
| *F27B 7/20* | (2006.01) |
| *F27D 19/00* | (2006.01) |
| *F27D 21/00* | (2006.01) |

(52) U.S. Cl.
CPC ........ *F27B 7/2033* (2013.01); *F27D 21/0014* (2013.01); *F23N 5/006* (2013.01); *F27B 1/26* (2013.01); *F27D 2019/0015* (2013.01); *F27D 2019/0034* (2013.01)

(58) Field of Classification Search
CPC ..... F27D 2019/0015; F27D 2019/0034; F23N 5/006
See application file for complete search history.

(56) References Cited

U.S. PATENT DOCUMENTS

| | | | |
|---|---|---|---|
| 2009/0283015 A1* | 11/2009 | Gasser | ........... F27B 7/2033 |
| | | | 432/103 |
| 2016/0214893 A1 | 7/2016 | Komatsu et al. | |
| 2017/0260089 A1* | 9/2017 | Klegraf | ........... F27B 7/34 |
| 2021/0033341 A1* | 2/2021 | Fujishima | ........... F23N 5/102 |

FOREIGN PATENT DOCUMENTS

| | | |
|---|---|---|
| DE | 25 19 884 A1 | 11/1975 |
| DE | 10 2014 113 127 A1 | 3/2016 |
| DE | 10 2016 211 181 A1 | 12/2017 |
| WO | WO-2017220457 A1 * 12/2017 | ........... C04B 7/4407 |
| WO | 2021/023567 A1 | 2/2021 |

OTHER PUBLICATIONS

English Translation of International Search Report issued in PCT/EP2022/052749, dated May 3, 2022.

Sengupta, Prasunjit, "Refractories for the Cement Industry", Springer, ISBN: 978-3-030-21339-8 (2020).

Atkins, Peter, et al., "Atkins' Physical Chemistry", Oxford University Press, ISBN: 0-7167-8759-8 (2006).

Chatterjee, Anjan Kumar, "Cement, Production Technology Principles and Practice", CRC Press Taylor & Francis Group, ISBN: 978-1-138-57066-5 (2018).

* cited by examiner

SYSTEM AND METHOD FOR THERMALLY TREATMENT OF AIR-DISPERSIBLE RAW MATERIAL

CROSS REFERENCE TO RELATED APPLICATIONS

This application is a U.S. National Stage Entry of International Patent Application Serial Number PCT/EP2022/052749, filed Feb. 4, 2022, which claims priority to German Patent Application No. DE 10 2021 201 356.2, filed Feb. 12, 2021, and Belgian Patent Application No. BE 2021/5101, filed Feb. 12, 2021, the entire contents of which are incorporated herein by reference.

FIELD

The present disclosure generally relates to a plant and to a method for thermal treatment of air-dispersible raw material, especially cement raw meal and/or mineral products, having a conduit through which hot gases flow and at least one means of adding the raw material.

BACKGROUND

Treatment of cement clinker or supplementary cementitious materials (SCMs) or lime or ores or clays or other mineral products requires large amounts of thermal energy to dry and/or to calcine and/or to reduce and/or to sinter the ground raw meal. For this purpose, the raw meal is heated, for example in an entrained flow, to a required temperature before being subjected to further treatment. A conduit described hereinafter with a fuel treatment region may be used in branches of industry in which raw materials are subjected to thermal treatment. Examples here are the cement industry and/or mineral industry.

For production of cement clinker, for example, raw meal composed of ground lime-containing and silicate-containing rock is subjected to a heat treatment, wherein the limestone is freed of $CO_2$ and converted to burnt lime, CaO. In a further step, the raw meal that has been deacidified by freeing it of $CO_2$ is typically sintered under the influence of heat to give various calcium silicate phases.

In the preliminary calcination (deacidification), the hot raw meal that exits from the second cyclone stage from the bottom of a cyclone preheater cascade is entrained by hot gas flowing in from the rotary furnace and guided into a calciner disposed between the cyclone preheater and rotary furnace. This is typically a riser conduit in which oxygen-containing furnace gas and calcination material are conducted in cocurrent and react with one another. In order to maintain the endothermic deacidification reaction, fuels are added in the calciner.

In the conventional air-driven furnace line, the combustion air required for the calciner firing may be guided, for example, directly through the rotary furnace and/or, in a separate gas conduit, called the tertiary air conduit, from the clinker cooler parallel to the rotary furnace to the calciner.

In a furnace line operated with pure oxygen, the oxygen required for the calciner firing may, for example, be guided directly through the rotary furnace and/or, in a separate gas conduit, called the tertiary gas conduit, from the clinker cooler parallel to the rotary furnace to the calciner.

DE 10 2014 113 127 A1 discloses a plant for thermal treatment of raw meal. Especially in the case of calciners with a reduced riser tube length, controlled adjustment of the combustion and the resulting thermal output has not been possible to date. Because of such fluctuations in performance, relatively short calciners have only been of limited utility to date.

Thus a need exists to provide a plant and a method for thermal treatment of raw materials, especially a calciner, which is subject to a lower degree of fluctuation in thermal output.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
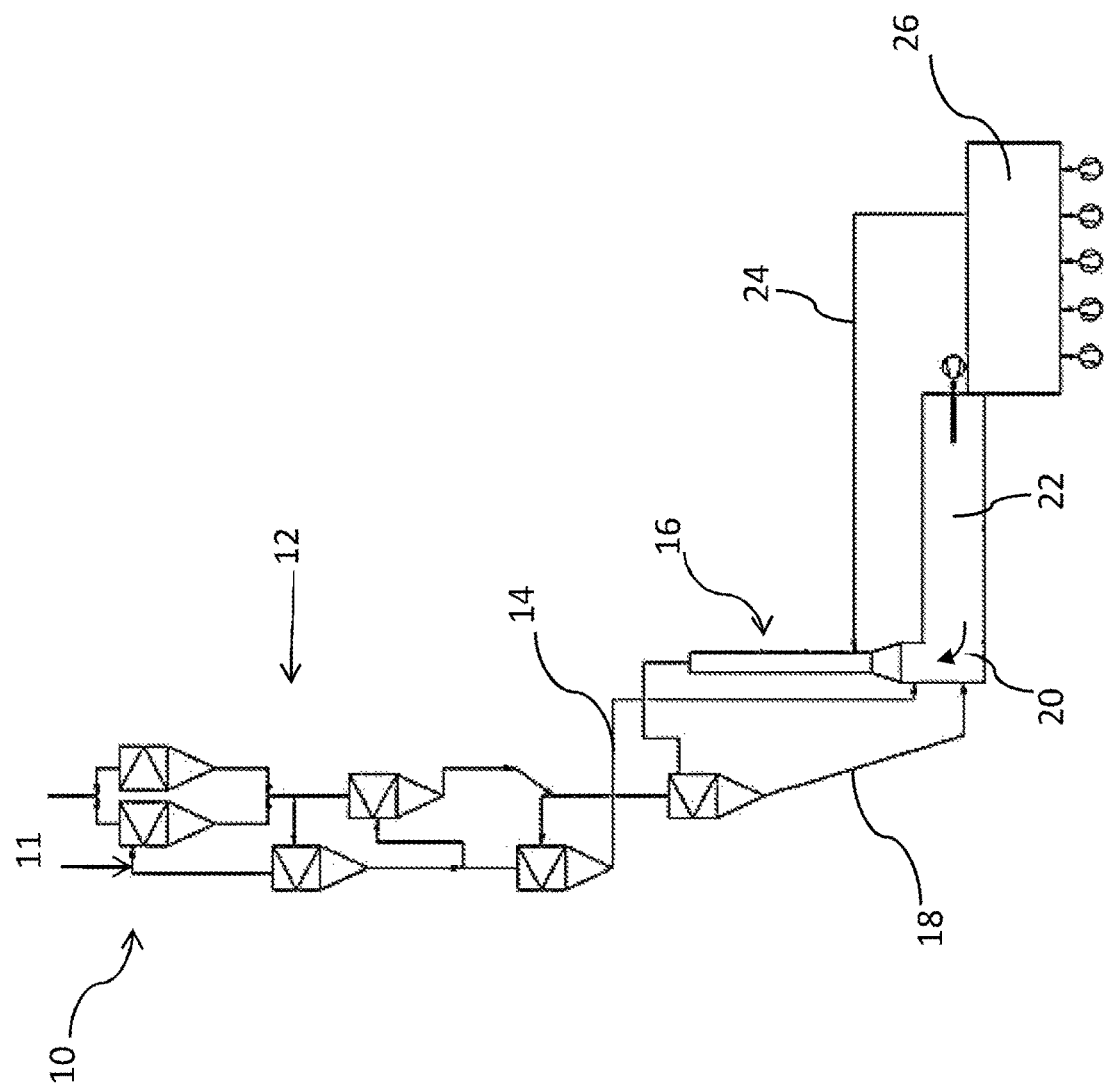
FIG. 1 shows a schematic view of a plant for production of cement clinker according to the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A method of thermal treatment of air-dispersible raw material, especially cement raw meal and/or mineral products, in a first aspect, comprises the following steps:
introducing the raw material into a conduit through which hot gases flow and
subjecting the raw material to thermal treatment by the hot gases and/or the radiant heat in the conduit,
at least partly converting the fuel in a treatment region, where the heat generated in the treatment region is supplied at least partly to the conduit, and
introducing an oxygen-rich gas into the treatment region,
ascertaining the oxygen content in the hot gas in the conduit and/or the gas temperature in the conduit, and
adjusting the amount of oxygen introduced into the treatment region under open-loop/closed-loop control depending on the temperature ascertained and/or the oxygen content,
preferably comparing the oxygen content ascertained with a target oxygen content value and increasing the amount of oxygen introduced into the treatment region when the oxygen content ascertained exceeds the target oxygen content value.

The oxygen content of the hot gas is preferably ascertained continuously. The hot gases include hot gases that preferably exit from a rotary furnace of a cement plant, which are introduced into the inlet region, especially the lower region of the conduit, and flow through the conduit. The conduit is a riser conduit, especially a riser tube, that extends essentially vertically and runs from the rotary furnace in the direction of the last preheating stage of the preheater of a cement plant. For example, the conduit is completely in the form of a riser conduit. The riser conduit is preferably designed such that hot gases can flow through it in an essentially vertical direction from the bottom upward.

The treatment of fuels is understood to mean, for example, the drying, combustion, at least partial degassing and/or the at least partial reaction of the fuel. The fuels are, for example, domestic, industrial and/or commercial wastes that are preferably in the form of coarse pieces.

In addition, these include liquid, pasty and solid wastes and biomasses that are suitable for energetic utilization/co-combustion, which are utilized for energy in pre-processed form. The fuels also include, for example, solvents, used oil, whole or shredded used tires, and dried sewage sludge, rice husks, straw or even animal meal. Inorganic and inert constituents are especially likewise present.

The treatment region comprises, for example, a combustion chamber for at least partial thermal treatment of the fuel. The treatment region especially comprises a region disposed at least partly separately from the conduit in fluidic terms, such that the hot gases flowing through the conduit at least flow incompletely through the treatment region, if at all. In particular, a change in the main flow direction of the conduit arises in the region. The treatment region and the conduit are connected to one another such that the hot gases generated in the treatment region by the at least partial conversion of the fuel flow at least partly into the conduit. The fuels, especially solids, preferably enter at least partly into the conduit from the treatment region. The heat generated in the treatment region, especially hot gases, and the heat from the further conversion of the fuel, even within the conduit, especially bring about the deacidification of the raw meal.

Optionally, the riser conduit is supplied with combustion air, for example cooler output air, via a means, especially a pipeline. The combustion air is especially introduced into the riser conduit at a position downstream of the treatment region in the flow direction of the hot gas.

The treatment region is preferably provided at least partly or completely around the circumference of the conduit and is especially in the form of a ring. The treatment region is formed, for example, as a radial bulge in the conduit. The treatment region preferably has a combustion space that opens into the conduit and in which the fuel is at least partly combusted. In particular, a burner is disposed within the treatment region, preferably within the combustion space. The burner is, for example, disposed on the rear wall of the treatment region that faces radially outward, preferably above or at the same height as the fuel inlet. The treatment region of the fuel is preferably provided against the conduit in such a way that at least a portion of the hot gases mixed with the raw material goes into the treatment region, where it comes into contact with the fuel, which is thus dried and/or at least partly degassed and/or at least partly converted. The treatment region preferably has an application surface to accommodate the fuel, where the fuel can be moved along the application surface especially by gravity, or by pneumatic or mechanical means. The plant preferably has at least one transport device, for example a conveying screw, for transportation of the fuel into the treatment region.

The oxygen-rich gas is preferably introduced into the treatment region, especially directly, via an oxygen conduit. The oxygen-rich gas is, for example, air, oxygen-enriched air or pure nitrogen. The oxygen conduit preferably opens into the treatment region, such that oxygen-rich gas is introduced into the treatment region and then into the riser conduit, preferably in addition to the cooler output air. The oxygen-rich gas is, for example, cooler output air, ambient air, bypass gas from a furnace bypass or pure oxygen. The oxygen content of the oxygen-rich gas is, for example, 21% to 100%, preferably at least 30% to 50%. In particular, the oxygen conduit has a metering device for metered addition of the amount of oxygen, especially of oxygen-rich gas, to the treatment region. The metering device is, for example, a flap or valve, which is preferably infinitely adjustable. The oxygen conduit is preferably disposed on the radially outward-facing outer wall of the treatment region, and opens into the treatment region, for example, above the fuel feed and especially above the burner.

Open-loop/closed-loop control of the amount of oxygen, especially oxygen-containing gas, in the treatment region enables adjustment of the thermal output of the calciner in a simple manner. The combustion within the combustion chamber can be adapted to the operating conditions of the calciner via such open-loop/closed-loop control, such that the calciner has a broad spectrum of use with regard to the use of fuels and combustion sites.

In a first embodiment, the oxygen content in the hot gas is ascertained downstream of the treatment region. For example, an oxygen measurement device is provided in the conduit or in the preheater. The oxygen content of the hot gas downstream of the treatment region, especially the combustion chamber, enables analysis of the combustion within the treatment region and corresponding open-loop/closed-loop control of the oxygen supply to the treatment region.

In a further embodiment, the temperature is ascertained within the treatment region and/or the conduit. The temperature measurement device is preferably provided downstream or within the treatment region.

In a further embodiment, the oxygen content ascertained is compared with a target oxygen content value and, in the event of variance of the oxygen content ascertained from the target oxygen value, the amount of oxygen and/or fuel introduced into the treatment region is increased or reduced. The target value may also be a target value range.

In a further embodiment, the amount of oxygen introduced into the treatment region is increased when the oxygen content ascertained exceeds the target oxygen content value. The target value is an oxygen concentration between 0% and 6%, especially 2% to 5%.

It is likewise conceivable to compare the oxygen content ascertained with at least two different target values, especially limits. In particular, the oxygen content ascertained is compared with a maximum target oxygen content value. The amount of oxygen introduced into the treatment region is preferably increased when the oxygen content ascertained exceeds the maximum target oxygen content value in particular. The oxygen content ascertained is preferably compared with a minimum target oxygen content value. The amount of oxygen introduced into the treatment region is preferably reduced when the oxygen content ascertained exceeds the minimum target oxygen content value in particular.

According to one finding by the inventors, a low oxygen content in the hot gas downstream of the treatment region suggests excessive combustion within the treatment region, and so the oxygen supply to the treatment region is reduced in the case of a low oxygen content and the oxygen supply to the treatment region is increased in the case of a high oxygen content.

In a further embodiment, the temperature ascertained is compared with a target temperature value and, in the event of variance of the temperature ascertained from the target temperature value, the amount of oxygen and/or fuel introduced into the treatment region and/or the amount of combustible fuel introduced via the burner is increased or reduced. Such a target value is a temperature between 750° C. and 1050° C., especially 850° C. to 1000° C.

It is likewise conceivable to compare the temperature ascertained with at least two different target values, especially limits. In particular, the temperature ascertained is compared with a maximum target temperature value. The amount of oxygen or fuel introduced into the treatment region is reduced when the temperature ascertained exceeds the maximum target temperature value. The temperature ascertained is preferably compared with a minimum target temperature value. The amount of oxygen or fuel introduced into the treatment region is increased when the temperature ascertained goes below the minimum target temperature value.

In a further embodiment, the calorific value of the fuel is ascertained and the amount of oxygen and/or fuel introduced into the treatment region is adjusted under open-loop/closed-loop control depending on the calorific value ascertained. The calorific value preferably includes the heating value, the fuel moisture content and/or the level of fuel dewatering. The calorific value, especially the heating value, the fuel moisture content and/or the level of fuel dewatering, is preferably ascertained by near infrared spectroscopy (NIR) via an NIR measurement device. The NIR measurement device is preferably disposed outside the treatment region such that it analyzes the fuel with regard to heating value, fuel moisture content and/or degree of dewatering before it enters the treatment region. The NIR measurement device is preferably connected to the open-loop/closed-loop control device for transmission of the data ascertained, such as heating value, fuel moisture content and/or level of fuel dewatering.

For example, the disclosure encompasses a method of producing cement, especially cement clinker, wherein raw meal is heated in a preheater, burnt in a furnace, especially a rotary furnace, and then cooled in a cooler. The raw meal heated in the preheater is preferably subjected to thermal treatment, for example, by the method described above.

A plant for thermal treatment of air-dispersible raw material, especially cement raw meal and/or mineral products, for performance of the method of the disclosure may have a conduit through which hot gases can flow and at least one means of adding the raw material to the conduit, and a treatment region for thermal treatment of fuels, which is connected to the conduit such that at least a portion of the heat generated in the treatment region goes into the conduit, and an oxygen conduit for conduction of oxygen-rich gas, which opens into the treatment region. The plant has a temperature measurement device for ascertaining the gas temperature and/or an oxygen measurement device for ascertaining the oxygen content of the hot gas. In addition, the plant has an open-loop/closed-loop control device designed to adjust the amount of oxygen introduced into the treatment region via the oxygen conduit under open-loop/closed-loop control depending on the temperature ascertained and/or the oxygen content ascertained.

The advantages and designs described in relation to the method are likewise applicable in apparatus terms to the plant for thermal treatment of air-dispersible raw material.

The open-loop/closed-loop control device is preferably connected to the metering device for open-loop/closed-loop control for the metered addition of oxygen-containing gas to the treatment region.

In a further embodiment, the oxygen measurement device is provided downstream of the treatment region. The oxygen content is preferably ascertained continuously.

In a further embodiment, the temperature measurement device is provided within the treatment region or in the conduit.

In a further embodiment, the open-loop/closed-loop control device is designed such that it compares the oxygen content ascertained with a target oxygen content value and, in the event of variance of the oxygen content ascertained from the target oxygen value, increases or reduces the amount of oxygen introduced into the treatment region.

In a further embodiment, the open-loop/closed-loop control device is designed such that it increases the amount of oxygen introduced into the treatment region when the oxygen content ascertained exceeds the target oxygen content value.

In a further embodiment, the open-loop/closed-loop control device is designed such that it compares the temperature ascertained with a target temperature value and, in the event of variance of the temperature ascertained from the target temperature value, increases or reduces the amount of oxygen introduced into the treatment region and/or the amount of combustible fuel introduced via the burner.

The burner is preferably connected to a fuel conduit for conduction of preferably readily combustible, especially liquid, fuel into the combustion chamber. The burner is, for example, a burner probe via which the liquid fuel is introduced into the combustion chamber and especially ignited.

The oxygen conduit is optionally connected to the burner, where the latter is disposed above the fuel supply and, when the oxygen value exceeds the target or the temperature in the treatment region goes below the target, assures the combustion conditions in the treatment region by addition of readily combustible fuel and introduced oxygen.

The oxygen conduit and a burner feed, which may be in the form of a probe, is optionally connected to the treatment region, both of which are disposed above the inlet of the fuel supply and, when the oxygen value exceeds the target or when the temperature in the treatment region goes below the target, assure the combustion conditions in the treatment region by addition of readily combustible fuel and introduced oxygen.

In a further embodiment, the plant includes a device for ascertaining the calorific value of the fuel, which is connected to the open-loop/closed-loop control device for transmission of the calorific value ascertained, and wherein the open-loop/closed-loop control device is designed such that it adjusts the amount of oxygen and/or fuel introduced into the treatment region via the oxygen conduit under open-loop/closed-loop control depending on the calorific value ascertained.

The disclosure encompasses, for example, a plant for production of cement, especially cement clinker, having a preheater, a plant for thermal treatment of air-dispersible raw material, as described above, a furnace, especially a rotary furnace, and a cooler.

FIG. 1 shows a plant for production of cement clinker, for example, comprising a multistage preheater 12 for preheating cement raw meal 11, a calciner 16 for precalcining the preheated cement raw meal 14, a furnace 22 for burning the precalcined cement raw meal 18 to give cement clinker, and a cooler 26 for cooling the cement clinker. The hot gases 20 formed in the furnace 22 flow first through the calciner 16 and then through the preheater 12. In addition, a cooler output air 24 formed in the cooler 22 is utilized as combustion air in the calciner 16.

Figure 2:
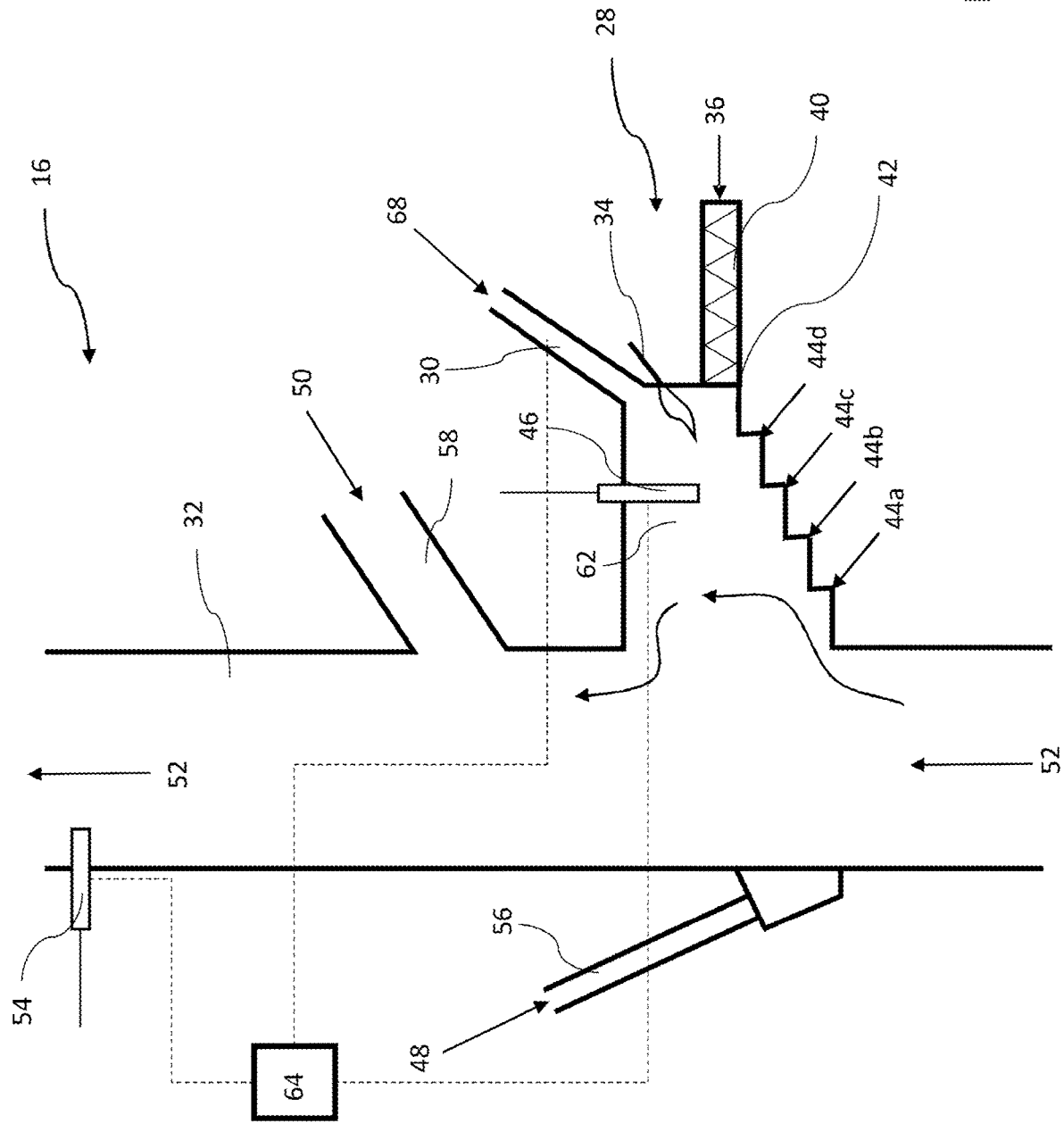
FIG. 2 shows a schematic view of a plant for thermal treatment of air-dispersible raw material according to the disclosure.

FIG. 2 shows a working example for the design of the calciner 16. This working example may also relate to further plants for thermal treatment or chemical conversion of air-dispersible raw material, for example ore reduction, and is therefore not restricted to a calciner and/or furnace line for production of cement clinker.

FIG. 2 shows a plant 16 for thermal treatment of an air-dispersible raw material, especially a calciner 16. The plant has a conduit 32 that extends essentially vertically, on which a treatment region 28 has been provided. It is likewise conceivable that more than one treatment region 28 is provided on the conduit 32, for example two or three treatment regions, in which case these, for example, are essentially identical. The treatment region 28 forms a radial bulge, especially extension, of the conduit 32 and has a combustion space 62 which is open in each case with respect to the conduit 32 and opens into the interior of the conduit 32. The treatment region 28 has an essentially horizontal application surface 42 which is formed, by way of example, by a table and four adjoining steps in the direction of the conduit 32. Additionally provided are means of adding fuel 36, which, in the working example shown, by way of example, comprise pendulum flaps and/or a conveying screw 40. The fuel 36 is preferably introduced into the treatment region 28 via a fuel inlet, where the fuel inlet is preferably disposed at the same height or above the application surface 42 and especially in the radially outward-facing rear wall of the treatment region 28.

Using the means of adding the fuel 36, the fuel 36 is pushed onto the application surface 42. The raw material 48 to be subjected to thermal treatment is fed in in a lower region of the conduit 32 via the means 56, especially via a conduit. In addition, the conduit 32 can be supplied with oxygen-containing combustion air 50 via means 58, especially a conduit. The oxygen-containing combustion air is, for example, cooler output air 24 according to FIG. 1 or oxygen-enriched air. In particular, a burner 34 is disposed in the treatment region 28. The burner 34 is preferably provided in the rear, radially outward-facing region of the treatment region 28 and preferably above the fuel inlet. The means 58 of supplying oxygen-containing combustion air is disposed, by way of example, downstream of the treatment region 28 in flow direction of the hot gas 52.

In addition to the means 58, an oxygen conduit 30 should be included for conduction of oxygen-rich gas 68, for example air, oxygen-enriched air or pure oxygen, into the treatment region 28, such that oxygen-rich gas is introduced into the treatment region 28 in addition to the cooler output air 24. The oxygen-rich gas is, for example, cooler output air, ambient air, bypass gas from a furnace bypass, or pure oxygen. The oxygen content of the oxygen-rich gas 68 is, for example, 21% to 100%, preferably at least 30% to 50%. In particular, the oxygen conduit 30 has a metering device (not shown in FIG. 2) for metered addition of the amount of oxygen, especially of oxygen-rich gas 68, into the treatment region 28. The oxygen conduit 30 is preferably disposed on the radially outward-facing outer wall of the treatment region 28 and opens into the treatment region 28, for example, above the fuel feed and especially above the burner 34. In a further execution, the oxygen-rich gas may also be introduced into the treatment region 28 via the burner 34. In a further execution, the burner 34 is operated with combustible, fine-grain solid, liquid or gaseous fuel. Both the oxygen conduit and the fuel conduit of the burner 34 have a metering apparatus.

The combustion chamber 62 is connected to the conduit 32 in such a way that a portion of the hot gases 52 mixed with the raw material 48 goes into the combustion space 62, for example in the manner of a return flow, where it comes into contact with the fuel 36 dwelling on the application surface 42, which is thus dried and/or partly degassed and/or at least partly converted. After a sufficient dwell time on the table of the application surface 42, the fuel 36 is pushed onto the first step in that new fuel is added by means of the screw 40. For transport of the fuel 36 from the first step onto the subsequent steps or for dropping of the fuel 36 from the steps into the conduit 32, air pulse devices 44a-d are provided in the region of the steps, which are preferably designed for pneumatic conveying of the fuel 36 in the direction of the conduit 32. It is likewise conceivable that, alternatively or additionally, blowers, pushers or rams are provided for conveying of the fuel 36. By means of a controller (not shown in more detail), the conveying screw 40 and the air pulse devices 44a-d are actuated in a synchronized manner, such that the fuel 36 dwells for a sufficient period in the combustion space 62, where it is at least partly converted in the manner desired.

The fuel 36 that goes into the conduit 32 is entrained by the hot gas 52 and further converted or combusted. The effect of the "return flow", where the portion of hot gases 52 flowing upward in the conduit 32 goes into the combustion space 62, occurs.

The means 56 of feeding in raw material 48 is disposed upstream of the treatment region 28 in flow direction of the mixture of hot gas 52 and raw material 48. The means 56 are, for example, a pipeline that opens into the riser conduit 32 and is provided, for example, with a flap for prevention or metered addition of the flow of air or material into the conduit 32.

Downstream of the treatment region 28 is provided a measurement device 54 in the interior of the conduit 32. It is likewise conceivable that the measurement device 54 is disposed in the preheater 12, such that there is no absolute necessity of a measurement in the conduit 32. The measurement device 54 is designed to ascertain the oxygen content in the hot gas 52. In particular, the measurement device 54 ascertains the oxygen content in the hot gas stream downstream of the treatment region 28. The measurement device 54 is preferably designed to continuously ascertain the oxygen content in the hot gas 52.

A temperature measurement device 46 is preferably provided in the treatment region 28 and is especially designed to ascertain the temperature within the treatment region 28. The plant 16 additionally includes an open-loop/closed-loop control device 64 which is connected to the oxygen measurement device 54 and the temperature measurement device 46 in such a way that the oxygen measurement device 54 transmits the oxygen content ascertained, and the temperature measurement device 46 the temperature ascertained, to the open-loop/closed-loop control device 64. It is likewise conceivable that the open-loop/closed-loop control device 64 is connected merely to one measurement device 46, 54: the temperature measurement device 46 or the oxygen measurement device 54. The open-loop/closed-loop control device 64 is additionally preferably connected to the oxygen conduit 30, especially to the metering device for metered addition of oxygen to the treatment region 28. The metering device is preferably disposed within or connected to the oxygen conduit 30. In a further execution, the open-loop/closed-loop control device 64 is additionally preferably connected to the fuel conduit of the burner 34, especially to the metering device for metered addition of combustible fuel into the treatment region 28.

In addition, the plant 16 optionally has a device (not shown) for ascertaining the calorific value of the fuel 36, especially the fuel moisture content and/or the level of fuel dewatering. The device is, for example, an NIR measurement device that ascertains the fuel moisture content and/or the level of fuel dewatering by near infrared spectroscopy. The device for ascertaining the calorific value of the fuel 36 is preferably connected to the open-loop/closed-loop control device 64 for transmission of the calorific value ascertained.

In the operation of the plant 16 for thermal treatment of air-dispersible raw material 48, the mixture of hot gas 52 and raw material flows through the conduit 32 from the bottom upward.

The temperature of about 500-1300° C., preferably 800-1200° C., which is maintained by means of the treatment region 28 over the slope of the conduit 32 ensures deacidification of the raw material. The open-loop/closed-loop control device 64 preferably serves to establish an essentially constant thermal output of the plant 16.

The open-loop/closed-loop control device 64 is especially designed such that it compares the oxygen content ascertained with a target oxygen content value and, in the event of variance of the oxygen content ascertained from the target oxygen value, increases or reduces the amount of oxygen introduced into the treatment region 28. It is likewise conceivable to compare the oxygen content ascertained with at least two different target values, especially limits. In particular, the oxygen content ascertained is compared with a maximum target oxygen content value. The amount of oxygen introduced into the treatment region 28 is increased when the oxygen content ascertained exceeds the maximum target oxygen content value. The oxygen content ascertained is preferably compared with a minimum target oxygen content value. The amount of oxygen introduced into the treatment region 28 is reduced when the oxygen content ascertained goes below the minimum target oxygen content value.

The open-loop/closed-loop control device 64 is especially designed such that it compares the temperature ascertained with a target temperature value and, in the event of variance of the temperature ascertained from the target temperature value, increases or reduces the amount of oxygen introduced into the treatment region 28. It is likewise conceivable to compare the temperature ascertained with at least two different target values, especially limits. In particular, the temperature ascertained is compared with a maximum target temperature value. The amount of oxygen introduced into the treatment region 28 is reduced when the temperature ascertained exceeds the maximum target temperature value. The temperature ascertained is preferably compared with a minimum target temperature value. The amount of oxygen introduced into the treatment region 28 is increased when the temperature ascertained goes below the minimum target temperature value.

The open-loop/closed-loop control device 64 is optionally designed such that it compares the calorific value ascertained with a target calorific value and, in the event of variance of the calorific value ascertained from the target calorific value, increases or reduces the amount of oxygen and/or fuel introduced into the treatment region 28. It is likewise conceivable to compare the calorific value ascertained with at least two different target values, especially limits. In particular, the calorific value ascertained is compared with a maximum target calorific value. The amount of oxygen and/or fuel introduced into the treatment region 28 is reduced when the calorific value ascertained exceeds the maximum target calorific value. The calorific value ascertained is preferably compared with a minimum target calorific value. The amount of oxygen and/or fuel introduced into the treatment region 28 is increased when the calorific value ascertained goes below the minimum target calorific value.

LIST OF REFERENCE NUMERALS

10 plant for production of cement clinker
11 cement raw meal
12 preheater
14 preheated raw material
16 calciner
18 precalcined raw material
20 hot gases from the rotary furnace
22 rotary furnace
24 cooler output air
26 cooler
28 treatment region
30 oxygen conduit
32 conduit
34 burner
36 fuel
38 means of adding fuel
40 transport screw
42 application surface
44a-d air pulse device
46 temperature measurement device
48 preheated raw material
50 oxygen-containing combustion air/cooler output air
52 hot gas
54 oxygen measurement device
56 means of supplying raw material
58 means of supplying oxygen-containing combustion air
60 means of adding fuel
62 combustion chamber
64 open-loop/closed-loop control device
66 temperature measurement device
68 oxygen-rich gas

What is claimed is:

1. A method of thermal treatment of air-dispersible raw material comprising:
   introducing the raw material into a conduit through which hot gases flow;
   subjecting the raw material to thermal treatment by the hot gases and/or radiant heat in the conduit, wherein the conduit is a riser conduit;
   converting fuel at least partly in a treatment region;
   supplying, at least partially, heat generated in the treatment region to the conduit, wherein the treatment region and the conduit are connected to each other such that the hot gases are generated in the treatment region by the at least partial conversion of the fuel and flow from the treatment region into the conduit;
   introducing an oxygen-rich gas into the treatment region;
   ascertaining an oxygen content in the hot gas;
   adjusting by open-loop control or closed-loop control, depending on the oxygen content ascertained, an amount of oxygen introduced via the oxygen-rich gas into the treatment region, wherein the oxygen content ascertained is compared with a target oxygen content value, wherein the target oxygen content value is an oxygen concentration between 0% and 6%;

determining that the oxygen content ascertained exceeds the target oxygen content value; and in response to determining that the oxygen content ascertained exceeds the target oxygen content value, increasing the amount of oxygen introduced into the treatment region.

2. The method of claim 1, wherein in the flow direction of the hot gas the oxygen content in the hot gas is ascertained downstream of the treatment region.

3. The method of claim 1, wherein the gas temperature is ascertained within the treatment region or the conduit and wherein the amount of oxygen introduced into the treatment region is adjusted by open-loop or closed-loop control depending on the temperature ascertained.

4. The method of claim 3, wherein the temperature ascertained is compared with a target temperature value and, in the event of variance of the temperature ascertained from the target temperature value, the amount of oxygen introduced into the treatment region and/or the amount of combustible fuel introduced via a burner is increased or reduced, wherein the target temperature value is a temperature between 750° C. and 1050° C.

5. The method of claim 1, wherein the amount of oxygen introduced into the treatment region is increased or reduced based on variance of the oxygen content ascertained from the target oxygen value.

6. The method of claim 1, further comprising ascertaining a calorific value of the fuel and adjusting the amount of oxygen and/or fuel introduced into the treatment region by open-loop control or closed-loop control depending on the calorific value ascertained.

* * * * *